(12) United States Patent
DesJardins et al.

(10) Patent No.: US 11,357,281 B2
(45) Date of Patent: Jun. 14, 2022

(54) METHOD AND APPARATUS FOR NON-DESTRUCTIVE MEASUREMENT OF FACEGUARD STRUCTURAL STIFFNESS

(71) Applicant: Clemson University Research Foundation, Clemson, SC (US)

(72) Inventors: John DesJardins, Clemson, SC (US); Gregory S. Batt, Clemson, SC (US); Alexander Bina, Clemson, SC (US)

(73) Assignee: CLEMSON UNIVERSITY RESEARCH FOUNDATION, Clemson, SC (US)

( * ) Notice: Subject to any disclaimer, the term of this patent is extended or adjusted under 35 U.S.C. 154(b) by 355 days.

(21) Appl. No.: 16/657,209

(22) Filed: Oct. 18, 2019

(65) Prior Publication Data

US 2020/0121018 A1  Apr. 23, 2020

Related U.S. Application Data

(60) Provisional application No. 62/747,510, filed on Oct. 18, 2018.

(51) Int. Cl.
  *G01M 5/00* (2006.01)
  *A42B 3/20* (2006.01)
(52) U.S. Cl.
  CPC ..................................... *A42B 3/20* (2013.01)
(58) Field of Classification Search
  CPC ........ A42B 3/20; G01M 5/0075; A63B 71/10; G01N 3/30
  See application file for complete search history.

(56) References Cited

U.S. PATENT DOCUMENTS

| 3,139,624 A | 7/1964 | Humphrey |
| 3,331,236 A | 7/1967 | Payne et al. |
| 3,373,443 A | 3/1968 | Marietta |
| 4,006,626 A | 2/1977 | Ruzica et al. |
| 4,161,874 A * | 7/1979 | Specker .................... G01L 5/16 73/12.01 |
| 4,363,140 A | 12/1982 | Correale |

(Continued)

OTHER PUBLICATIONS

K.L. Johnson et al., Constrained topological optimization of a football helmet facemask based on brain response, Materials and Design 111 (Aug. 25, 2016) 108-118.

*Primary Examiner* — Tajash D Patel
(74) *Attorney, Agent, or Firm* — Kim and Lahey Law Firm, LLC; Seann P. Lahey

(57) ABSTRACT

A force generator applying a force load against a facemask. A first load cell carrying a first portion of the facemask at an attachment point of the facemask where the facemask is attachable to a helmet. A second load cell carrying a second portion of the facemask at another attachment point of the facemask where the facemask is attachable to a helmet. A first attachment platform carrying the first load cell, wherein the first attachment platform is laterally movable in at least two degrees of freedom. A second attachment platform carrying the second load cell, wherein the second attachment platform is laterally movable in at least two degrees of freedom. The force generator directs the contact plate against the facemask to cause a horizontal deformation of the facemask and a lateral movement of the attachment platforms to allow for repeatable force load testing on a single facemask.

20 Claims, 8 Drawing Sheets

(56) References Cited

U.S. PATENT DOCUMENTS

| | | | |
|---|---|---|---|
| 4,390,995 A | 7/1983 | Walck | |
| 4,633,531 A | 1/1987 | Nimmons | |
| 5,165,270 A | 11/1992 | Sansalone et al. | |
| 6,079,053 A | 6/2000 | Clover et al. | |
| 6,378,140 B1 | 4/2002 | Abraham et al. | |
| 6,763,524 B2 | 7/2004 | Halstead et al. | |
| 6,871,525 B2 | 3/2005 | Withnall et al. | |
| 6,934,971 B2 | 8/2005 | Ide et al. | |
| 7,509,835 B2 * | 3/2009 | Beck | A42B 3/046 2/425 |
| 8,209,784 B2 | 7/2012 | Nimmons et al. | |
| 9,032,558 B2 | 5/2015 | Leon | |
| 9,080,931 B2 | 7/2015 | Carbo et al. | |
| 9,140,637 B2 * | 9/2015 | Kis, Jr. | G01N 3/30 |
| 9,314,061 B2 | 4/2016 | Hanson et al. | |
| 9,372,139 B2 | 6/2016 | Kis et al. | |
| 9,750,298 B2 | 9/2017 | Summerville | |
| 9,797,821 B2 | 10/2017 | Duma et al. | |
| 2008/0256685 A1 | 10/2008 | Lampe et al. | |
| 2016/0279502 A1 | 9/2016 | Brandt | |
| 2019/0086309 A1 * | 3/2019 | Brandt | G01N 3/303 |

\* cited by examiner

METHOD AND APPARATUS FOR NON-DESTRUCTIVE MEASUREMENT OF FACEGUARD STRUCTURAL STIFFNESS

RELATED APPLICATIONS

This application is a United States non-provisional patent application claiming priority from U.S. Provisional patent application Ser. No. 62/747,510 titled "METHOD AND APPARATUS FOR NON-DESTRUCTIVE MEASUREMENT OF FACEGUARD STRUCTURAL STIFFNESS" filed Oct. 18, 2018 and incorporated herein.

BACKGROUND OF THE INVENTION

1) Field of the Invention

A novel protective equipment stiffness testing system and method for the non-destructive evaluation of facemasks by reconditioners and facemask manufacturers to differentiate the potential impact performance of novel facemask designs.

2) Description of the Related Art

Estimates for sport related concussions fall between 1.6-3.8 million cases per year. Previous research focused on full helmet systems, and these helmets incorporate faceguards that can vary significantly in composition and design. Impact tests have demonstrated an inconclusive relationship between helmet performance with and without a faceguard. Previous research has theorized that stiffer faceguards place athletes at greater risk for brain tissue deformation. Therefore, there is a need to determine structural stiffness of football faceguards isolated from the rest of the helmet system.

In 1974, the National Operating Committee for the Standards of Athletic Equipment (NOCSAE) released their first standard protocol to evaluate football helmets. This procedure was developed in response to the high rate severe traumatic brain injury and skull fracture occurring during football activity. NOCSAE standard 001 outlines the use of a twin-wire guided drop mechanism used to generate an impact of a helmeted biofidelic headform on a stationary anvil. Traditionally, to validate the effectiveness of a helmet in preventing severe traumatic brain injury, impact evaluations are performed on helmets without a face guard attached. NOCSAE standard 087 outlines a procedure to use the same twin wire apparatus to evaluate the safety of helmet systems including a facemask.

We have learned through impact results for over 1000 facemasks that the NOCSAE twin-wire drop apparatus is ineffective in evaluating the performance of a specific facemask at the design, structural, or material levels. In addition, testing facemasks with the NOCSAE twin-wire drop apparatus causes permanent damage to the facemask, rendering testing masks unusable on the field.

The commonly used methods to simulate head impacts are not sensitive enough to reliably differentiate facemask designs based on their impact performance. These methods are also destructive to the tested facemask, making facemasks that are tested with these methods unusable. Using destructive testing does not allow a facemask to be tested during various points in its life cycle. The method and apparatus presented here to measure facemask stiffness has been demonstrated to be non-destructive and sensitive enough to differentiate across facemask designs, making the disclosed technology presented here advantageous over existing evaluation paradigms.

Our research determined that both linear acceleration and Gadd's Severity index were ineffective in differentiating helmet performance based on the facemask used across all three football helmets.

The NOCSAE twin wire drop system uses gravity to impact a helmeted headform. Impact severity is measured both by the peak linear acceleration, and the Gadd's Severity Index. The helmeted headform is dropped from five feet to generate an impact velocity of 5.54 m/s+/−3%. The error in the severity index calculation for each test sample used demonstrates the low sensitivity of the NOCSAE drop tower in quantifying helmet system performance. Data meant to evaluate facemask performance is affected by: the slack in the twin wires, the chin strap age, the internal padding resilience, and the accelerometer cable whip.

When evaluating facemask performance using the NOCSAE drop tower, the helmet used affects the ability of the test to differentiate facemask performance across facemask styles. For this reason, a need exists to establish a novel method to characterize facemasks that removes the dependence on the rest of the helmet system.

To evaluate the role the facemask design plays in the protectiveness of the entire helmet system, a more sensitive measurement method is necessary.

Thus, a need exists for an apparatus and method to improve evaluations for novel facemask designs independent of a helmet. It would be advantageous as well if this improved apparatus and method can test samples in a non-destructive manner.

Accordingly, it is an object of the present invention to provide a system and method for measuring the structural stiffness of football facemasks models in a repeatable non-destructive manner.

BRIEF SUMMARY OF THE INVENTION

The above objective is accomplished by providing a system and method for measuring the structural stiffness of football facemasks models, the facemask as a spring structure with two lateral degrees of freedom and one rotational degree of freedom at the two locations separated by the largest horizontal distance of any two points on the facemask structure. A force generator provides a controlled input deflection that is applied as a point load to the facemask in various locations. The load required to reach the applied deflection of the facemask is measured and charted, with applied bad (N) as the dependent variable and facemask deflection (mm) as the independent variable. The slope of this graph is the structural stiffness of the mask. The fixture used to constrain the facemask during testing allows for the facemask to be oriented at various angles to measure facemask stiffness when the input deflection is applied at different locations. The facemask is fixed to the stiffness testing apparatus rigidly. The two contact locations between the facemask and the testing apparatus are free to move laterally under low friction.

The system and method is directed to an apparatus that orients a football facemask in a range of positions in order to measure the structural stiffness of a facemask at different locations. The structural stiffness of a facemask can be a potential predictor for facemask impact performance. Our research has confirmed that the procedure used to measure structural stiffness in a quasi-static manner is both sensitive enough to measure differences across facemask styles, manufacturers, and materials, and is non-destructive to the sporting equipment including facemasks.

The proposed method and apparatus to measure facemask stiffness described in this disclosure is more effective in testing facemasks than the method described in NOCSAE Document ND 087, but there is not currently an apparatus available to perform structural stiffness testing in a non-destructive manner.

The present invention provides a system for non-destructive measurement of protective equipment structural stiffness comprising a force generator having a contact plate configured to apply a force load against a facemask; a first load cell configured to securely hold a first portion of said facemask at an attachment point of said facemask where said facemask is attachable to a helmet; a second load cell configured to securely hold a second portion of said facemask at another attachment point of said facemask where said facemask is attachable to a helmet; a first attachment platform carrying said first load cell, wherein said first attachment platform is laterally movable in at least two degrees of freedom; a second attachment platform carrying said second load cell, wherein said second attachment platform is laterally movable in at least two degrees of freedom; whereby said force generator directs said contact plate against said facemask to cause at least a horizontal deformation of said facemask and a lateral movement of said first and second attachment platforms to allow for repeatable force load testing on a single facemask.

In a further advantageous embodiment, said first and second load cells measure deformation of said facemask in response to the force applied to said facemask by said force generator and contact plate.

In a further advantageous embodiment, said force generator and said first and second load cells are operatively associated with a set of computer readable instructions configured to measure and display in a graphical arrangement a vertical deformation and a lateral deformation of the facemask when force is applied against a portion of said facemask.

In a further advantageous embodiment, said force generator comprises a plunger having a vertical movement pressing said contact plate downward against a portion of said facemask.

In a further advantageous embodiment, said contact plate has a flat surface for engaging said facemask and a diameter of between about 1 inch to about 6 inches for distributing the force load against a portion of said facemask.

In a further advantageous embodiment, said plunger and contact plate apply a force load to cause a deformation of said facemask at a rate of about 100 mm/min.

In a further advantageous embodiment, said first and second attachment platforms are movable in at least one degrees of freedom of rotation along a vertical axis when said force load is applied to said facemask.

In a further advantageous embodiment, a plurality of ball bearings carry each of said first and second attachment platforms to provide for the lateral and rotational movement of said attachment platforms when said force load is applied to said facemask.

In a further advantageous embodiment, said first and second attachment platforms tilt to adjust an angle of said facemask relative to said contact plate for selectively adjusting the engagement of a portion of said facemask with said contact plate.

In a further advantageous embodiment, a support block carried by each of said first and second load cells; said support blocks including a clamp to secure said facemask to said support block.

In a further advantageous embodiment, said support blocks include an angled receiving surface carrying said clamp for engaging said facemask.

In a further advantageous embodiment, said angled receiving surface ranges from between about 1° to about 90°.

The present invention further provides a method for non-destructive measurement of protective equipment structural stiffness comprising the steps of providing a force generator having a contact plate configured to apply a force load against a facemask; mounting a first portion of said facemask to a first load cell carried on a first attachment platform, wherein said first attachment platform is laterally movable in at least two degrees of freedom; mounting a second portion of said facemask to a second load cell carried on a second attachment platform, wherein said second attachment platform is laterally movable in at least two degrees of freedom; directing said contact plate against a portion of said facemask and applying said force load against said facemask to cause at least a horizontal deformation of said facemask and a lateral movement of said first and second attachment platforms; retracting said force generator and contact plate from engagement with said facemask; repeatedly redirecting said contact plate against said facemask; measuring at least the horizontal deformation of said facemask resulting from the applied force load.

In a further advantageous embodiment, said force generator comprises a plunger having a vertical movement pressing said contact plate downward against a portion of said facemask to cause an input deflection of said facemask of between about 5 mm to about 30 mm.

In a further advantageous embodiment, said input deflection caused by said contact plate applying said force load to said facemask does not exceed about 5 mm.

In a further advantageous embodiment, repeated redirecting of said contact plate against said facemask produces a coefficient of variation for resulting stiffness measurements of between about 1.1% to about 3.3%.

In a further advantageous embodiment, said force generator directs said contact plate to apply a force load against said facemask at a rate of about 100 mm/min.

In a further advantageous embodiment, the method includes adjusting an angle of said facemask on said first and second load cells relative to said contact plate to change a position of engagement between said facemask and said contact plate.

In a further advantageous embodiment, the method includes pre-loading said facemask with about 100 N of force load before data collection to seat said facemask in a desired position relative to said contact plate of said force generator.

The present invention further provides a system for non-destructive measurement of protective equipment structural stiffness comprising a force generator having a contact plate configured to apply a force load against a facemask, wherein said force generator is defined by a plunger having a vertical movement for pressing said contact plate downward against a portion of said facemask; a first load cell carrying a first portion of said facemask at an attachment point of said facemask where said facemask is attachable to a helmet; a second load cell carrying a second portion of said facemask at another attachment point of said facemask where said facemask is attachable to a helmet; a support block carried by each of said first and second load cells, wherein said support blocks each include a clamp to secure said facemask to said support block; a first attachment platform carrying said first load cell, wherein said first attachment platform is laterally movable in at least two degrees of freedom and movable in at least one degrees of freedom of rotation along a vertical axis when said force load is applied to said facemask; a second attachment platform carrying said second load cell, wherein said second attachment platform is laterally movable in at least two degrees of freedom and movable in at least one degrees of freedom of rotation along a vertical axis when said force load is applied to said facemask; a plurality of ball bearings carrying each of said first and second attachment platforms to provide for said lateral and rotational movement of said attachment platforms when said force load is applied to said facemask; whereby said force generator directs said contact plate against said facemask to cause at least a horizontal deformation of said facemask and at least a lateral movement of said first and second attachment platforms to allow for repeatable force load testing on a single facemask.

BRIEF DESCRIPTION OF THE SEVERAL VIEWS OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

Figure 1B:
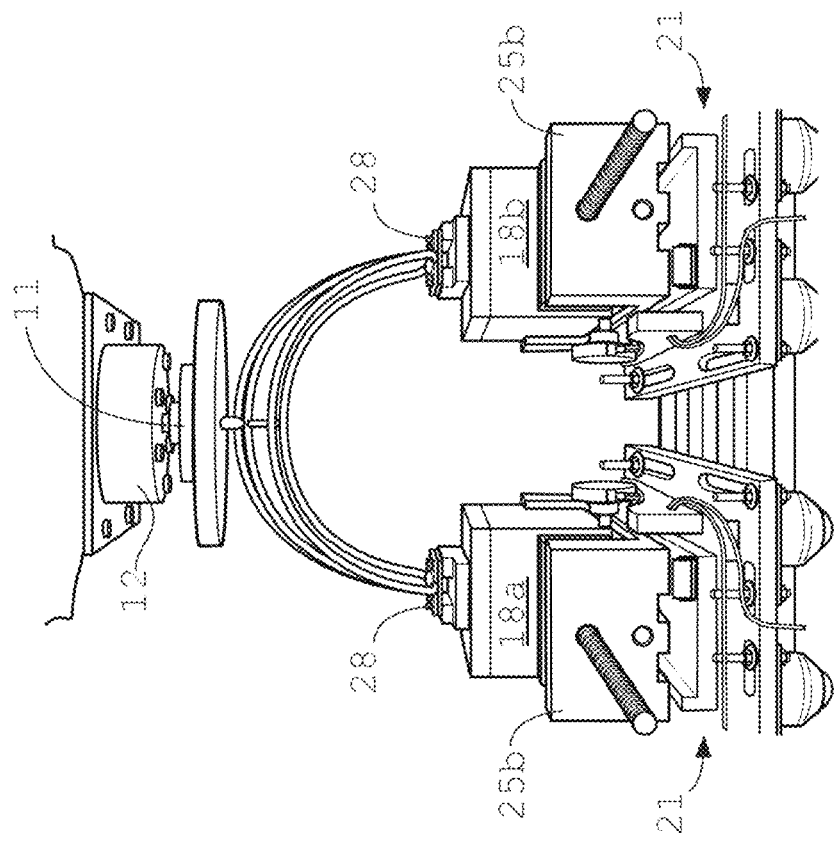
FIG. 1B shows a perspective view of the system according to the present invention.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples.

However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF THE INVENTION

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

NOCSAE has made an adaptation to NOCSAE Document 087 that has included a stiffness test for all newly manufactured facemasks. There are several differences between the NOCSAE stiffness test and the stiffness measurement system and method of the present invention as detailed herein:

1) The NOCSAE stiffness test requires rigid fixation of the facemask, restricting movement in any lateral or rotational direction, while the system and method of the present invention allows for movement in the lateral direction (x and y), as well as rotation at the facemask connection locations about the z-axis.

2) The NOCSAE stiffness test applies a load to the facemask at a rate of 10 in/min (254 mm/min). The system and method of the present invention can apply a load to the facemask at a rate of 3.94 in/min (100 mm/min) for greater sensitivity and control.

3) The NOCSAE stiffness test applies a load to the facemask with a 1-inch diameter plunger, while the system and method of the present invention can use a 6-inch diameter plunger.

4) The NOCSAE stiffness test applies a load to the facemask to deform the facemask by at least 3 inches, while the system and method of the present invention can deform the facemask by 5 mm sufficient to test structural rigidity in a non-destructive manner unlike the NOCSAE test. The rigid fixation of the facemask required by the NOCSAE stiffness test, combined with the required 3-inch deformation of the facemask, ensures permanent damage to the facemask using the NOCSAE stiffness test. The system and method of the present invention, by including two lateral degrees of freedom and one rotational degree of freedom at each facemask connection point to the testing apparatus, prevents the facemask from experiencing too much permanent deformation. Our research has demonstrated that deforming the facemask beyond 10 mm will result in permanent deformation above the ⅛-inch (3.2 mm) threshold described in the NOCSAE Document 087 as the maximum acceptable permanent deformation allowed in a facemask. Thus, points 1 and 4 above provide for a stiffness test that is non-destructive. Our research has shown that changing the loading rate applied to the facemask up to 200 mm/min does not significantly change the measurement of the structural stiffness of the facemask.

This system and method can also provide a stiffness test that generates a spectrum of differences across facemask designs. This spectrum does not change as a result of changes to the loading rate used to apply a load to the facemask.

When deforming the facemask by 5 mm, as is described by this system and method, the contact between the facemask and the plunger does not extend beyond 1 inch. Thus, the effective size of the plunger used in the system and method of the present invention may be similar to the size of the plunger outlined in the NOCSAE stiffness test. In conclusion, difference 1 and 4 are necessary to ensure this system and method is non-destructive, and difference 2 and 3 are less significant in comparison in order to achieve the resulting stiffness measurements in a non-destructive manner.

Figure 1A:
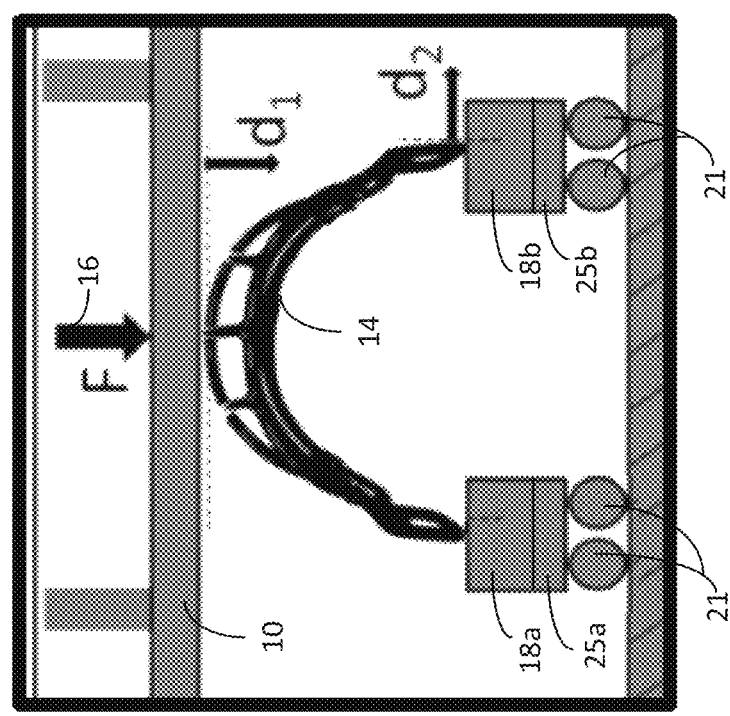
FIG. 1A shows a schematic of the aspects of the system and method according to the present invention.
Figure 2:
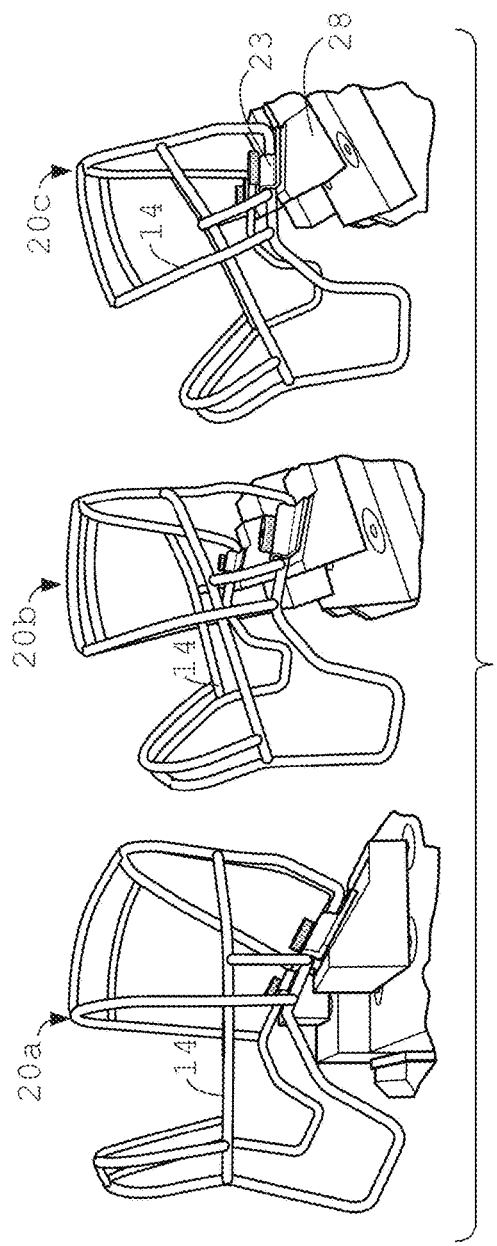
FIG. 2 shows a facemask mounted in selected orientations according to the present invention.

Referring to FIGS. 1A and 1B, a force F is placed on a contact plate 10 which is applied a force load against a facemask 14. A compression distance $d_1$ is measured according to F. The lateral displacement distance $d_2$ is measured according to F. In the illustrated embodiment, a force generator 12 is provided for directing contact plate 10 against facemask 14. In one embodiment, force generator 12 includes a pneumatic press having a plunger 11 carrying contact plate 10 for engaging and applying a force load to a selected portion of facemask 14. The contact plate 10 contacts facemask 14 applying F in a direction 16. Load cells 18a and 18b measure the deformation of the facemask in response to the force load placed on the facemask 14. Referring to FIG. 2, the contact plate 10 can contact and apply force loads to various areas of the facemask including the nose portion 20a, mouth portion 20b or chin portion 20c by adjusting the angle of the facemask as carried on load cells 18a and 18b and by adjusting the angle of attachment platforms 25a and 25b that carry load cells 18a and 18b.

Figure 6A:
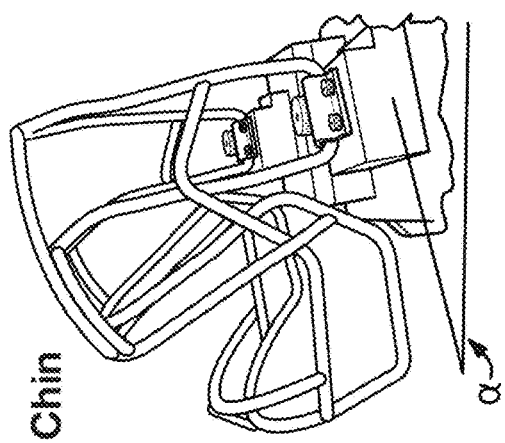
FIGS. 6A, 6B and 6C show a facemask mounted at a selected angle according to the present invention.
Figure 6B:
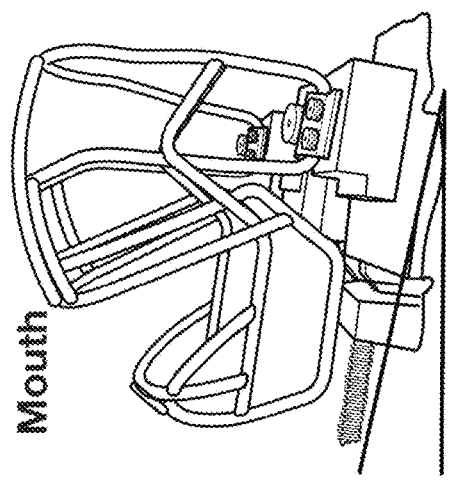
Figure 6C:
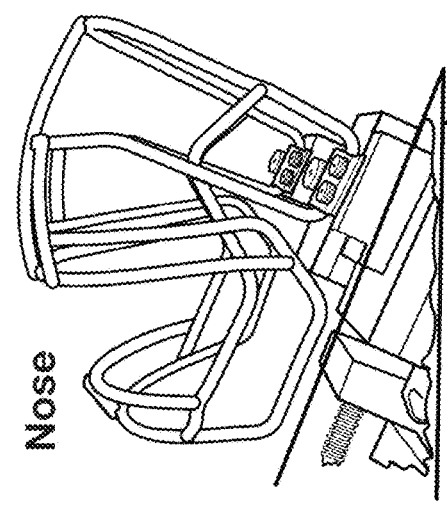

With further reference to FIGS. 6A through 6C, in the illustrated embodiment, attachment platforms 25a and 25b can each be an angle vice to allow for variation in the orientation of facemask 14 relative to contact plate 10. The angle vice secures load cells 18a and 18b and can be tilted to adjust the facemask angle. For example, an angle of a shows the angle of the vice and load cells relative to horizontal for various contact points of the contact plate 10. Each angle vice is carried by ball bearings 21, preferably rated for 250 lb loads or more, to provide for low-friction lateral movement of the facemask when loaded. These ball bearings 21 can provide for two degrees of freedom of translation, and one degree of freedom of rotation.

Figure 7A:
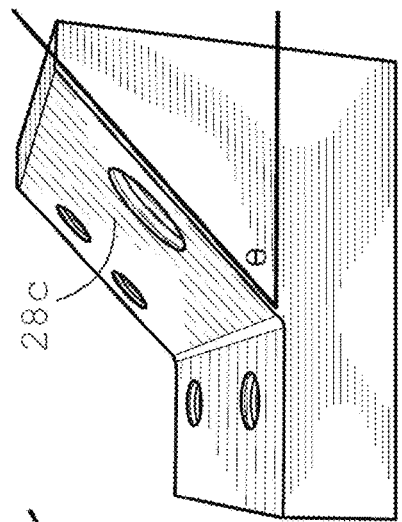
FIGS. 7A, 7B and 7C show support blocks according to the present invention.
Figure 7B:
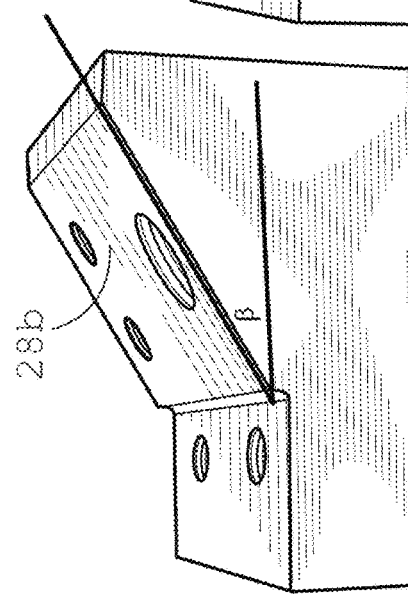
Figure 7C:
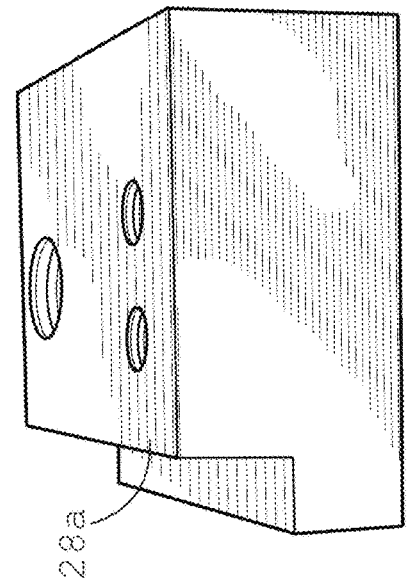

Referring to FIGS. 1B and 7A-7C, the system further includes support blocks 28 to mount a portion of facemask 14 to load cells 18a and 18b. The facemask is typically attached to support blocks 28 at a portion of facemask 14 that attached to the helmet. A clamp 23, as best shown in FIGS. 6A-6C, is provided on support blocks 28 to securely hold facemask 14 in position. As best shown in FIGS. 7A-7C, support blocks 28 can have a flat surface, such as 28a, or can include angles and e representing 30 and 60 degrees in the illustrated examples. The angle of the support blocks can range from 0-90° to achieve a desired angle and holding position for the facemask 14.

Figure 3:
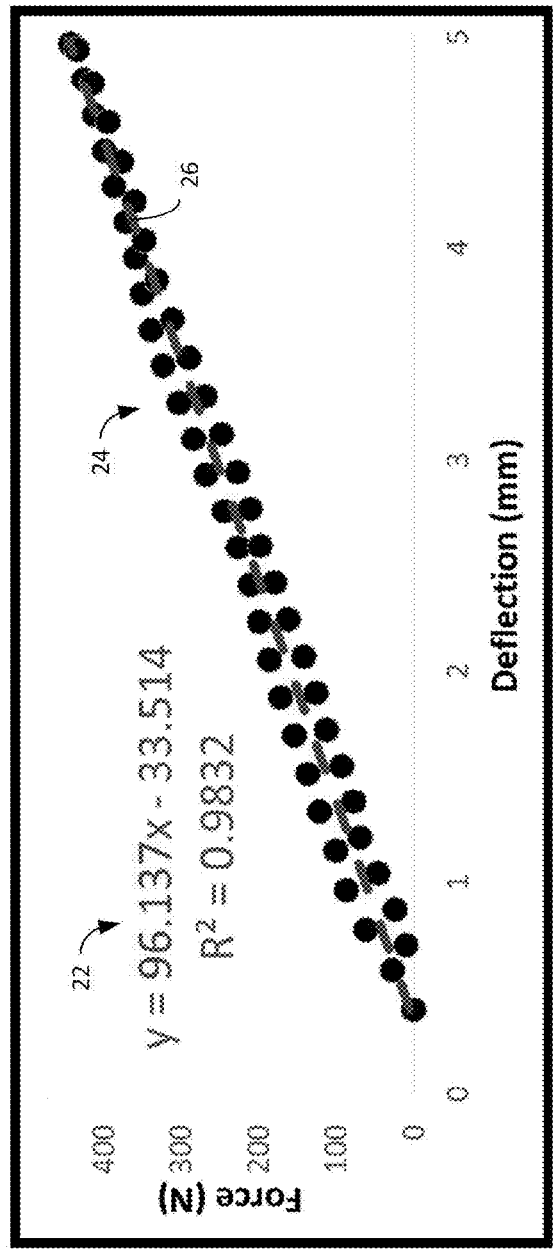
FIG. 3 shows a graphical representation of the results of the system and method according to the present invention.
Figure 4:
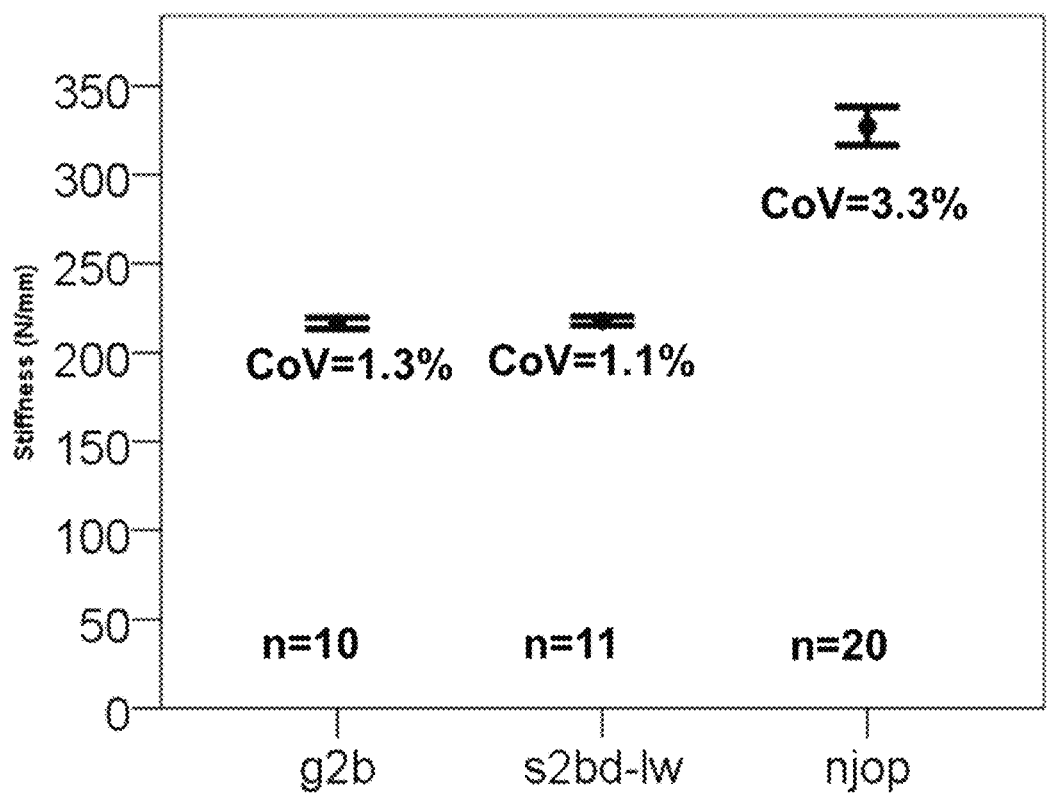
FIG. 4 shows a graphical representation of the results of the system and method according to the present invention.
Figure 5:
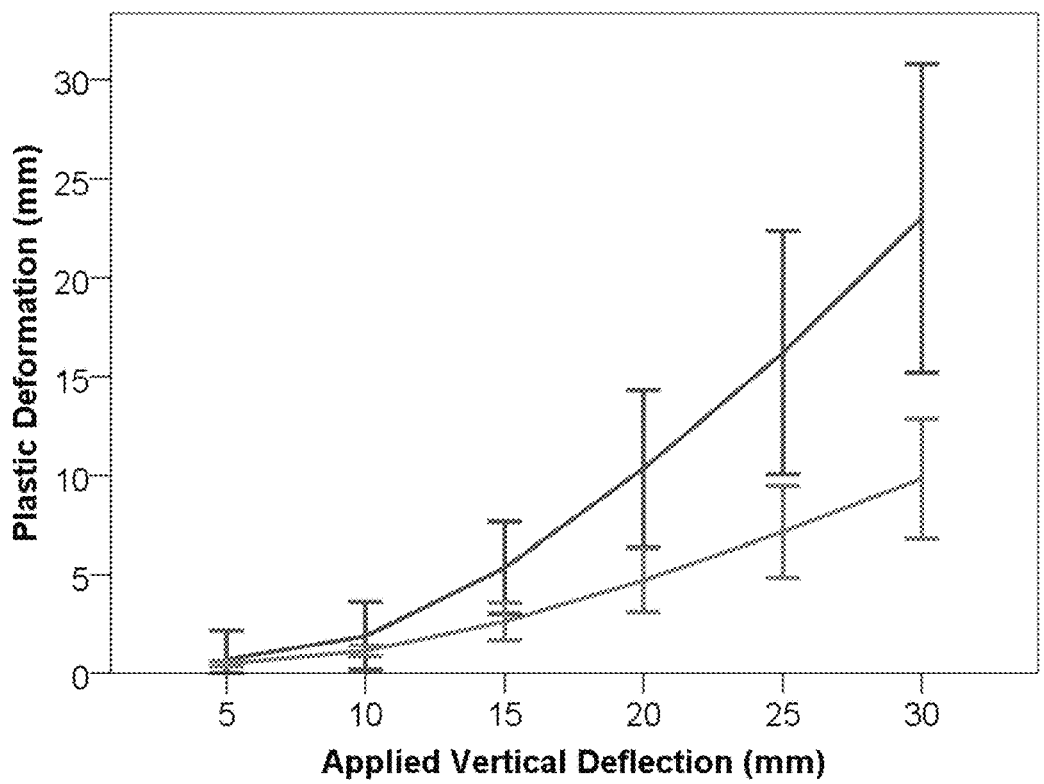
FIG. 5 shows a graphical representation of the results of the system and method according to the present invention.

The non-destructive results of the system and method can be used to repeatedly repressed a facemask to determine a force deflection curve as shown in FIG. 3. The stiffness numeric value 22, in this example, can be calculated from the curve 24 and repressed with line 26. Referring to FIG. 4, it is shown that the system and method of the present invention is repeatable. For three different mask styles, repeating the method using the system between 10 and 20 times resulted in repeatable non-destructive stiffness measurements. Referring to FIG. 5, it is shown that the system and method of the present invention is capable of allowing and measuring a vertical deflection of 5 mm, which is effective in preventing permanent vertical and horizontal deformation to the facemask beyond the acceptable threshold defined by the NOCSAE standards.

The system and method of the present invention includes positioning the facemask 14 in a manner to represent the arch structure of the facemask when attached to a helmet. Each side of the facemask can be secured to an independent attachment platform 25a and 25b at the two locations used to attach the facemask to the helmet shell as shown in FIGS. 1A, 1B, and 6A-6C. The sagittal plane orientation of each mask can be angled to allow for different directions of loading at locations such as the forehead, nose, mount or chin, as shown in FIGS. 2 and 6A-6C. When a force load is applied, the facemask arch can spread laterally due to the lateral movement of the attachment platforms 25a and 25b on ball bearings 21 so the facemask 14 can be modelled as a spring.

The system and method of the present invention include securing each mask onto the support blocks 28 using a clamp 23 that bolts onto support blocks 28 to maintain the facemask orientation during the stiffness test. An electromechanical universal testing system can be used to apply an input point deflection to each facemask. A 44 kN load cell 18a and 18b can be used to measure the force applied to the facemask 14. In a preferred embodiment, the testing method includes pre-loaded the facemask 14 with 100 N of force before data is collected in order to ensure the facemask is seated in proper position with respect to the testing apparatus as shown in FIGS. 1A and 1B. In one embodiment, the facemask can be compressed using a contact plate 10 having a flat engaging surface and a diameter of 15.2 cm. Other diameters and arrangements of contact plates may be used and the invention is not limited to the specific example as would be understood by one skilled in the art. The contact plate presses downwardly against and applies a force load to cause a deflection to the facemask at 100 mm/min, a similar rate used for helmet pad material characterization. Each deflection input can be applied at least twice, and data from the second deflection cycle can be used for stiffness calculations. When developing the protocol to measure structural stiffness of facemasks, multiple loading cycles can be applied using the present invention. Consistently, the first loading cycle can result in larger stiffness, regardless of facemask style, and the subsequent cycles resulted in consistent stiffness readings. Thus, the stiffness can be calculated using data collected from the second loading cycle. In one embodiment, the load cells 18a and 18b are force generator 12 are operatively associated with a set of computer readable instructions configured to measure and display in a graphical arrangement a vertical deformation and a lateral deformation of the facemask when force is applied against a portion of facemask 14. In one embodiment, deflection and applied force can be collected using software at a sampling rate of 20 Hz. Referring to FIG. 3, force and deflection data can be plotted, and a linear regression line used to fit to each force-deflection data set. The slope of this linear regression line can be used as the measurement for facemask stiffness.

Figure 8:
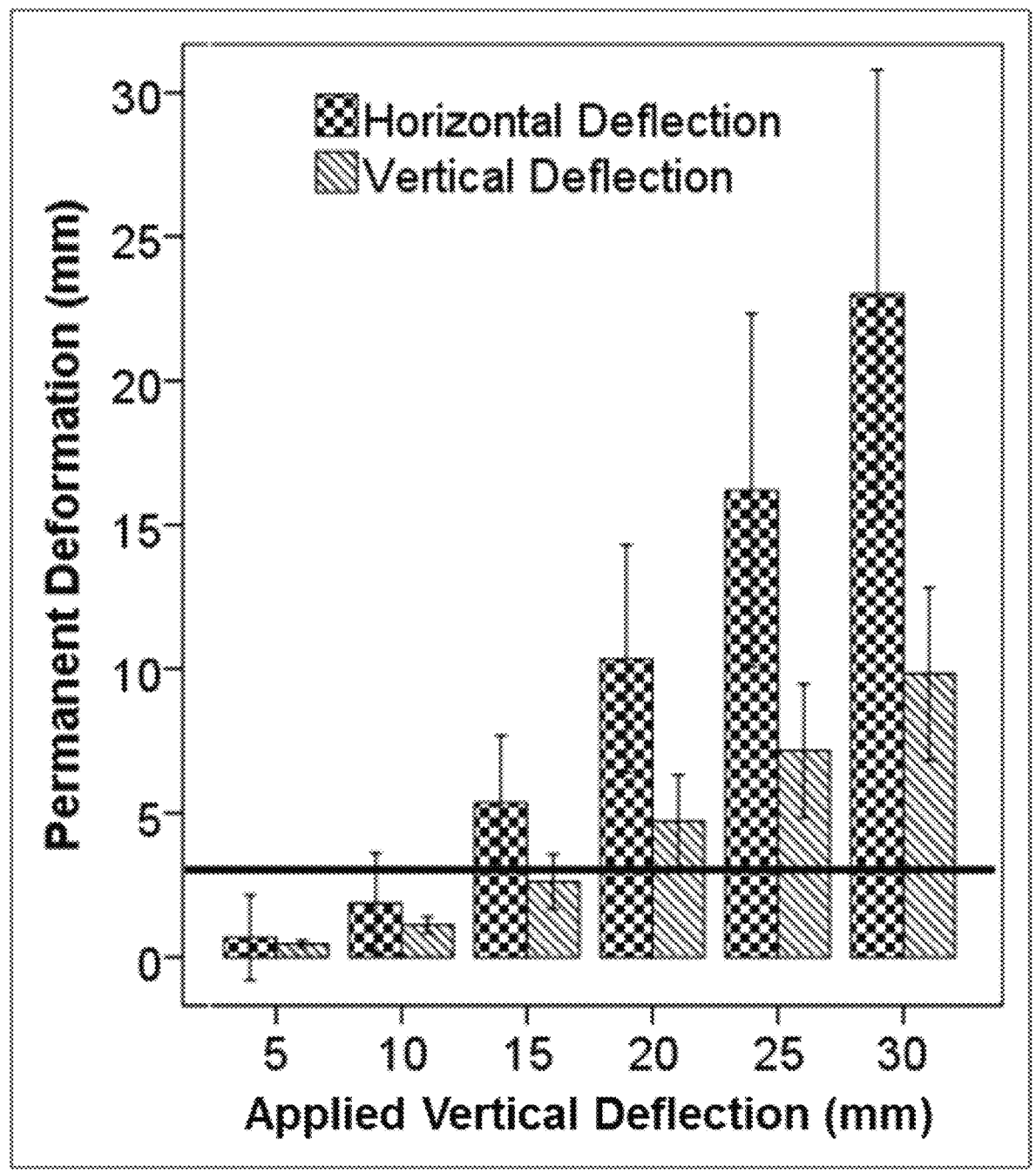
FIG. 8 shows a graphical representation of the results of the system and method according to the present invention.

Testing Example. A deflection of 5 mm applied to facemasks to measure stiffness is small enough to allow continued use of the facemask according to NOCSAE standards, but large enough to result in stiffness measurements that are different across facemask styles and materials. The first step in establishing a facemask stiffness test procedure was to identify an input deflection that would not result in extensive permanent facemask deformation. To accomplish this, facemasks were tested at input deflections of 5 mm, 10 mm, 15 mm, 20 mm, 25 mm and 30 mm. Input deflection was defined as the distance travelled by the impacting plate and was user-controlled. Three facemasks of each style can be used. Each facemask was attached to the testing apparatus using either 0 degree or 45-degree support blocks 28 carried on load cells 18a and 18b, depending on the shape of the facemask attachment bar, as shown in FIGS. 1A and 1B. All facemasks were compressed at a location meant to represent "nose impacts" 20a as shown in FIG. 2. Extensive permanent damage to a facemask was considered permanent deflection in the horizontal or vertical direction greater than 3.175 mm (⅛ in). An indication of horizontal and vertical deflection directions is shown in FIG. 1A. To measure permanent horizontal deflection, the facemask width can be measured before and after each load test with a set of calipers. To measure vertical deflection, the universal testing system can be used to measure the difference from the starting contact point, to the contact point at the end of the load test. Permanent deformation results of the non-destructive input threshold test are shown in the graph of FIG. 8.

Figure 9:
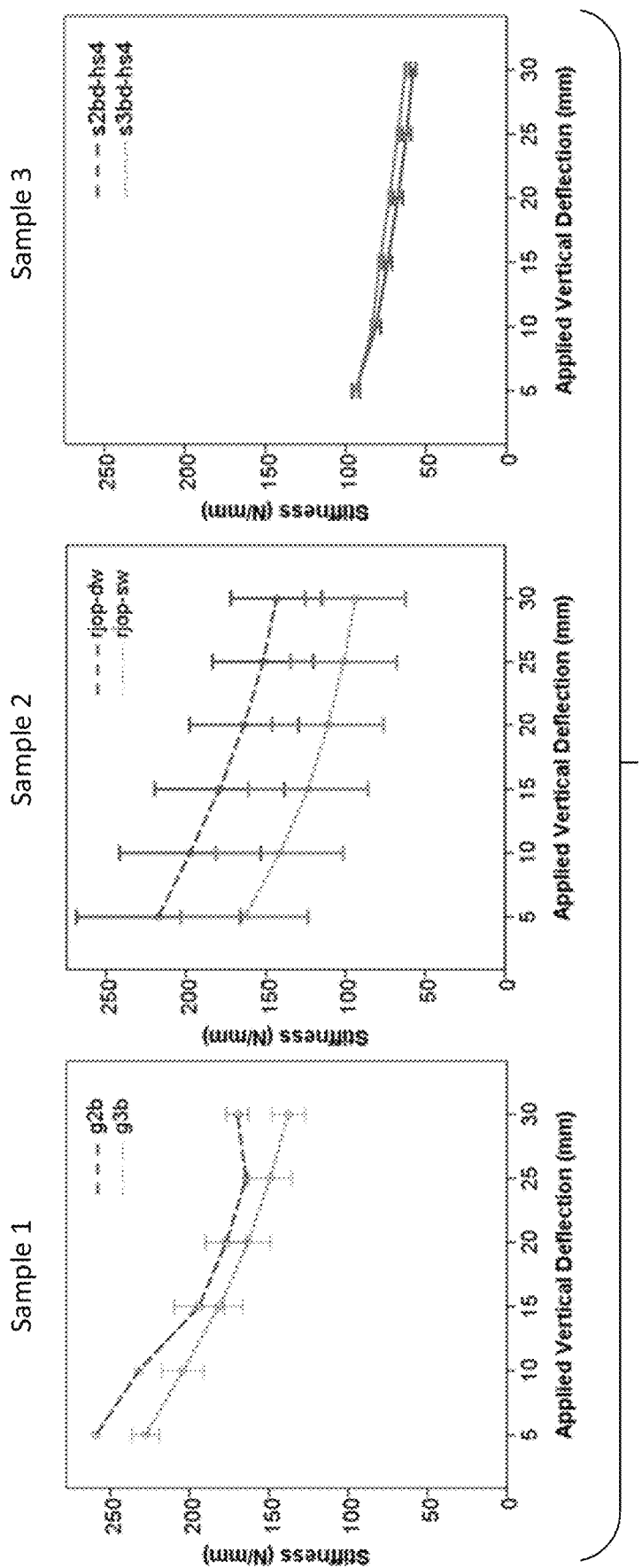
FIG. 9 is a graphical representation of the results of the system and method according to the present invention.

The second criteria for validation of the appropriate input deflection for a facemask stiffness test is that the input deflection is large enough to measure significant differences in stiffness across a variety of facemask styles. Facemasks corresponding to three different helmets were used to demonstrate the relationship of facemask stiffness and input deflection. Three masks of each style were tested at each input deflection. The facemask stiffness that resulted from each input deflection for each of the six facemasks is shown in samples 1, 2 and 3 of FIG. 9.

Figures 10, 11:
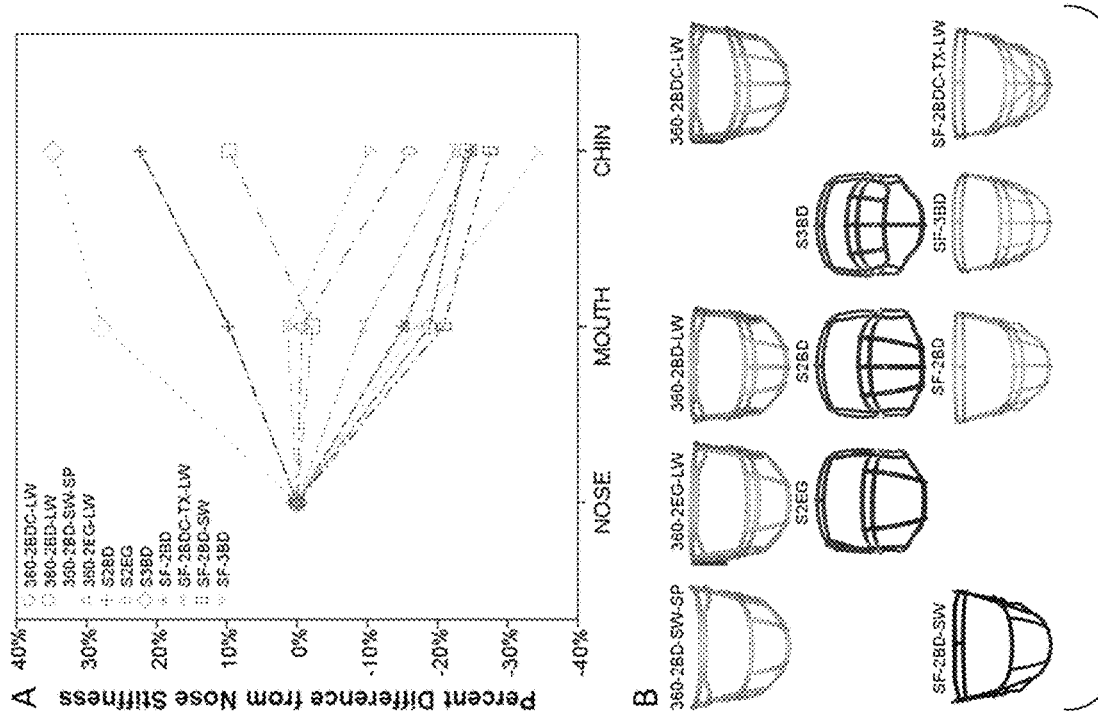
FIG. 10 is graphical representation of the results of the system according to the present invention.
FIG. 11 is a graphical representation of the results of the system and method according to the present invention; and, FIG. 12 is a graphical representation of the results of the system and method according to the present invention.

The reliability assessment of the proposed stiffness test was performed by repeating the stiffness measurement process on a single mask style and calculating its coefficient of variance. Previously used and reconditioned masks in three different styles were used for the reliability testing: The stiffness testing was performed at the "nose" location 20a multiple times for each facemask. The stiffness measured for each style is represented in FIG. 10 as a box and whisker plot. The box represents the interquartile range of stiffness for each mask style and the whiskers represent 1.5 times the 3rd and 1st quartile, respectively. The coefficient of variance for each mask style subgroup was also calculated by dividing the standard deviation by the subgroup mean as reported in FIG. 11.

Figure 12:
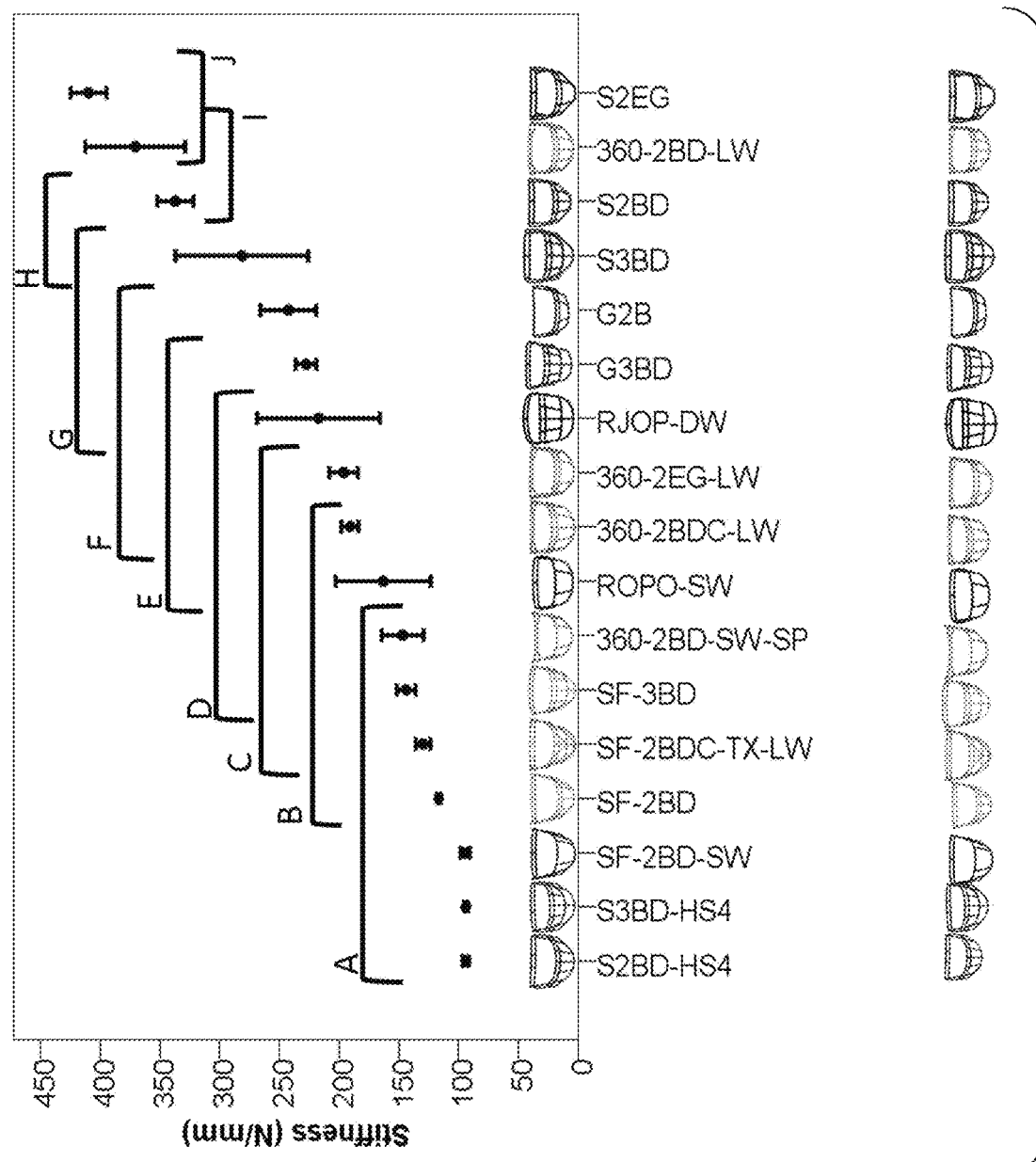

To demonstrate that the method could be used to non-destructively quantify differences between facemask styles, the permanent deflections were assessed and differences in facemask stiffness were compared. Three masks of each style were used, and their stiffness measurements were taken. The stiffness for each mask was measured at three different impact locations (e.g. "nose", "mouth" and "chin"). To identify if facemask stiffness differs across facemask styles, the difference in stiffness of each style of facemask tested was analyzed using a one-way ANOVA test (alpha=0.05), followed by a Tukey's Least Significant Difference Test, to determine which facemasks differed significantly in stiffness. The effect that the impact location has on stiffness is shown in FIG. 11, and the spectrum of facemask stiffness at the nose location is shown in FIG. 12. Results are for horizontal and vertical deformation that occurred after stiffness testing at 5, 10, 15, 20, 25, and 30 mm input deflection. For all input deflections, facemasks experienced more permanent horizontal deformation (spreading) than permanent vertical deformation. Permanent horizontal deformation is also more variable than permanent vertical deformation for all input deflections. The amount of permanent deformation, 3.2 mm (⅛ in) in one example, that is acceptable for a used facemask can be found in the standards established by NOCSAE. An applied vertical deflection of 5 mm results in permanent deformation, less than the threshold that dictates rejected facemasks. Input deflections from 5 mm to 30 mm are sufficient in demonstrating stiffness differences that exist across facemask styles. Since 5 mm of input deflection results in permanent deflection less than the NOCSAE threshold for accepting used facemasks, and since an input deflection of 5 mm is effective in demonstrating stiffness difference across facemask styles, a 5 mm input deflection was used for the remainder of the stiffness testing presented in this article.

The system and method have the ability to show that stiffness for the chin and mouth contact locations can be higher than the stiffness measured at the nose contact location. The system and method determines that the stiffness measured at the nose was similar to the stiffness measured at the mouth contact location for some styles. Therefore, to fully characterize a facemask, stiffness should be measured at multiple locations, as there is not a trend across all three contact locations consistent across all facemask styles used.

This system and method is a valid and reliable stiffness test to evaluate facemask performance in protective headgear systems. This system and method is a facemask stiffness test that is non-destructive according to established NOCSAE standards and is effective in demonstrating stiffness differences across facemask styles. It is a reliable testing of a facemask stiffness measurement procedure and can establish the construct validity of a stiffness test that requires stiffness measurements at three contact locations. The input deflection of 5 mm in this system and method is effective in producing stiffness measurements across facemask styles similar to the stiffness measurements produced at higher input deflections. Deflecting facemasks 5 mm is also effective in preventing permanent damage to a facemask above an acceptable permanent deformation threshold. Both vertical and horizontal bending resulting from a stiffness test using an input deflection of 5 mm are less than 3.175 mm.

For a single mask tested multiple times, the coefficient of variation (CoV) for the resulting stiffness measurements can be between 1.1% and 3.3%. For comparison, when using a pendulum impactor to generate head impacts, the CoV of 1 was measured for peak linear acceleration (PLA, g) measured during three impacts to the facemask region of an American football helmet at both 4.2 m/s and 5.1 m/s. Using a pendulum impactor to impact the facemask region, a PLA CoV between 1-10% was found. In a separate study using a pneumatic ram impactor, research resulted in a CoV of 3% in PLA when impacting the location where the facemask attaches to the helmet system at 9.3 m/s. When impacting the facemask directly at various impact velocities, research measured that a PLA coefficient of variance between 1-5% for non-centric impacts and 2-15% for centric impacts. For severity index measurements, it has been discovered that a a CoV between 2-29% exists. Also using a pneumatic ram, it has been measured that a CoV for PLA of 5% and 4% for impacts to the front or facemask locations exists respectively. For front impacts to helmets with facemasks from different generations of use, one researcher measured PLA CoV between 0-21%, with higher CoV occurring on samples that were impacted 12-16 times, as opposed to samples impacted 2-4 times. Based on previous work using two different methods to evaluate the impact performance of a helmet system that includes a facemask, the reliability of the stiffness measurement procedure presented in this system and method is comparable to the current paradigm.

In an analysis of the response of an athlete's jaw upon head impact in American football, one researcher identified three impact locations that involve the facemask that are correlated with head injury risk, and that the linear acceleration response of an impacted helmeted headform is different for each location. The impacts generated using a pneumatically-driven linear impactor feature the entire helmet system, as well as a biofidelic neckform, and it is not clear whether the difference in the acceleration response of the headform is related to the structural properties of the facemask or to the structural properties of other helmet or test system components.

Current methods used to evaluate facemask impact performance are dictated by NOCSAE document 087. This standard was designed to ensure that facemasks did not put an athlete at additional risk for severe traumatic brain injury. However, the use of a NOCSAE drop tower to differentiate facemask performance has been limited. Research using a NOCSAE drop tower was an effort to explain how a helmet performs with and without a facemask attached. These findings demonstrated that the impact severity of a helmeted headform is both increased and decreased with the presence of a facemask, depending on the helmet used. This demonstrates the need to establish a testing system that differentiates the potential performance of facemasks without confounding facemask performance with helmet performance, which is provided by the present invention. Stiffness has been demonstrated to be a valid metric to be used to compare facemasks across a spectrum of facemask styles and materials.

It is understood that the above descriptions and illustrations are intended to be illustrative and not restrictive. It is to be understood that changes and variations may be made without departing from the spirit or scope of the following claims. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

What is claimed is:

1. A system for non-destructive measurement of protective equipment structural stiffness comprising:
   a force generator having a contact plate configured to apply a force load against a facemask;
   a first load cell configured to securely hold a first portion of said facemask at an attachment point on a first side of said facemask where said facemask is attachable to a helmet;
   a second load cell configured to securely hold a second portion of said facemask at another attachment point on a second side of said facemask where said facemask is attachable to a helmet, wherein said attachment point on said second side is opposite to and laterally spaced apart from said attachment point on said first side;
   a first attachment platform carrying said first load cell, wherein said first attachment platform is laterally movable in at least two degrees of freedom;
   a second attachment platform carrying said second load cell, wherein said second attachment platform is laterally movable in at least two degrees of freedom;
   whereby said force generator directs said contact plate against said facemask to cause at least a horizontal deformation of said facemask and a lateral movement of said first and second attachment platforms to allow for repeatable force load testing on a single facemask.

2. The system of claim 1 wherein said first and second load cells measure deformation of said facemask in response to the force applied to said facemask by said force generator and contact plate.

3. The system of claim 2 wherein said force generator and said first and second load cells are operatively associated with a set of computer readable instructions configured to measure and display in a graphical arrangement a vertical deformation and a lateral deformation of the facemask when force is applied against a portion of said facemask.

4. The system of claim 1 wherein said force generator comprises a plunger having a vertical movement pressing said contact plate downward against a portion of said facemask.

5. The system of claim 4 wherein said contact plate has a flat surface for engaging said facemask and a diameter of between about 1 inch to about 6 inches for distributing the force load against a portion of said facemask.

6. The system of claim 4 wherein said plunger and contact plate apply a force load to cause a deformation of said facemask at a rate of about 100 mm/min.

7. The system of claim 1 wherein said first and second attachment platforms are movable in at least one degrees of freedom of rotation along a vertical axis when said force load is applied to said facemask.

8. The system of claim 7 including a plurality of ball bearings carrying each of said first and second attachment platforms to provide for the lateral and rotational movement of said attachment platforms when said force load is applied to said facemask.

9. The system of claim 1 wherein said first and second attachment platforms tilt to adjust an angle of said facemask relative to said contact plate for selectively adjusting the engagement of a portion of said facemask with said contact plate.

10. The system of claim 1 including a support block carried by each of said first and second load cells; said support blocks including a clamp to secure said facemask to said support block.

11. The system of claim 10 wherein said support blocks include an angled receiving surface carrying said clamp for engaging said facemask.

12. The system of claim 11 wherein said angled receiving surface ranges from between about 1° to about 90°.

13. A method for non-destructive measurement of protective equipment structural stiffness comprising the steps of:
providing a force generator having a contact plate configured to apply a force load against a facemask;
mounting a first portion of said facemask to a first load cell carried on a first attachment platform, wherein said first attachment platform is laterally movable in at least two degrees of freedom;
mounting a second portion of said facemask to a second load cell carried on a second attachment platform, wherein said second attachment platform is laterally movable in at least two degrees of freedom;
directing said contact plate against a portion of said facemask and applying said force load against said facemask to cause at least a horizontal deformation of said facemask and a lateral movement of said first and second attachment platforms;
retracting said force generator and contact plate from engagement with said facemask;
repeatedly redirecting said contact plate against said facemask;
measuring at least the horizontal deformation of said facemask resulting from the applied force load.

14. The method of claim 13 wherein said force generator comprises a plunger having a vertical movement pressing said contact plate downward against a portion of said facemask to cause an input deflection of said facemask of between about 5 mm to about 30 mm.

15. The method of claim 14 wherein said input deflection caused by said contact plate applying said force load to said facemask does not exceed about 5 mm.

16. The method of claim 13 wherein repeated redirecting of said contact plate against said facemask produces a coefficient of variation for resulting stiffness measurements of between about 1.1% to about 3.3%.

17. The method of claim 13 wherein said force generator directs said contact plate to apply a force load against said facemask at a rate of about 100 mm/min.

18. The method of claim 13 including adjusting an angle of said facemask on said first and second load cells relative to said contact plate to change a position of engagement between said facemask and said contact plate.

19. The method of claim 13 including pre-loading said facemask with about 100 N of force load before data collection to seat said facemask in a desired position relative to said contact plate of said force generator.

20. A system for non-destructive measurement of protective equipment structural stiffness comprising:
a force generator having a contact plate configured to apply a force load against a facemask, wherein said force generator is defined by a plunger having a vertical movement for pressing said contact plate downward against a portion of said facemask;
a first load cell carrying a first portion of said facemask at an attachment point on a first side of said facemask where said facemask is attachable to a helmet;
a second load cell carrying a second portion of said facemask at another attachment point on a second side of said facemask where said facemask is attachable to a helmet, wherein said attachment point on said second side is opposite to and laterally spaced apart from said attachment point on said first side;
a support block carried by each of said first and second load cells, wherein said support blocks each include a clamp to secure said facemask to said support block;
a first attachment platform carrying said first load cell, wherein said first attachment platform is laterally movable in at least two degrees of freedom and movable in at least one degrees of freedom of rotation along a vertical axis when said force load is applied to said facemask;
a second attachment platform carrying said second load cell, wherein said second attachment platform is laterally movable in at least two degrees of freedom and movable in at least one degrees of freedom of rotation along a vertical axis when said force load is applied to said facemask;
a plurality of ball bearings carrying each of said first and second attachment platforms to provide for said lateral and rotational movement of said attachment platforms when said force load is applied to said facemask;
whereby said force generator directs said contact plate against said facemask to cause at least a horizontal deformation of said facemask and at least a lateral movement of said first and second attachment platforms to allow for repeatable force load testing on a single facemask.

* * * * *